(12) United States Patent
Rueegg et al.

(10) Patent No.: US 8,775,862 B2
(45) Date of Patent: *Jul. 8, 2014

(54) TENANT RESCUE FOR SOFTWARE CHANGE PROCESSES IN MULTI-TENANT ARCHITECTURES

(71) Applicant: SAP AG, Walldorf (DE)

(72) Inventors: Andreas Willi Rueegg, Zurich (CH); Joerg Schmidt, Sinsheim (DE); Karolin Laicher, Rauenberg (DE); Michael Segler, Wiesloch (DE)

(73) Assignee: SAP AG, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/010,261

(22) Filed: Aug. 26, 2013

(65) Prior Publication Data

US 2013/0346787 A1    Dec. 26, 2013

Related U.S. Application Data

(63) Continuation of application No. 12/847,470, filed on Jul. 30, 2010, now Pat. No. 8,522,070.

(51) Int. Cl.
*G06F 11/00* (2006.01)

(52) U.S. Cl.
USPC .............................. 714/4.3; 714/4.4; 717/171

(58) Field of Classification Search
USPC .............................. 714/4.3, 4.4; 717/171–173
See application file for complete search history.

(56) References Cited

U.S. PATENT DOCUMENTS

| | | | | |
|---|---|---|---|---|
| 7,831,637 B2* | 11/2010 | Sattler et al. | | 707/805 |
| 8,060,585 B2* | 11/2011 | Waud et al. | | 709/221 |
| 8,209,564 B2* | 6/2012 | Vidal et al. | | 714/38.1 |
| 8,239,851 B2* | 8/2012 | Laicher et al. | | 717/168 |
| 2006/0059253 A1* | 3/2006 | Goodman et al. | | 709/223 |
| 2007/0157192 A1* | 7/2007 | Hoefler et al. | | 717/168 |
| 2008/0126110 A1* | 5/2008 | Haeberle et al. | | 705/1 |
| 2008/0184225 A1* | 7/2008 | Fitzgerald et al. | | 718/1 |
| 2010/0023933 A1* | 1/2010 | Bryant et al. | | 717/168 |
| 2011/0113424 A1* | 5/2011 | Ewington et al. | | 717/178 |
| 2011/0145807 A1* | 6/2011 | Molinie et al. | | 717/170 |
| 2011/0209139 A1* | 8/2011 | Dominick et al. | | 717/172 |
| 2011/0239189 A1* | 9/2011 | Attalla | | 717/121 |
| 2011/0252412 A1* | 10/2011 | Sasaki | | 717/168 |
| 2011/0296398 A1* | 12/2011 | Vidal et al. | | 717/171 |
| 2011/0321031 A1* | 12/2011 | Dournov et al. | | 717/171 |
| 2012/0030666 A1* | 2/2012 | Laicher et al. | | 717/173 |

* cited by examiner

*Primary Examiner* — Bryce Bonzo
*Assistant Examiner* — Elmira Mehrmanesh
(74) *Attorney, Agent, or Firm* — Mintz Levin Cohn Ferris Glovsky and Popeo, P.C.

(57) ABSTRACT

A multi-tenant system can be switched to a downtime state to implement a transition from a current state to a target state of a core software platform. During a second phase of the transition an error associated with tenant-specific content of a first customer tenant of the plurality of customer tenants of the multi-tenant system can be identified. The second phase can be suspended for the first customer tenant while continuing the second phase for a remainder of the plurality of customer tenants for which an error has not been identified. After a scheduled duration of the downtime state, the multi-tenant system can be reactivated such that the multi-tenant system includes the remainder of the plurality of customer tenants with the transition implemented and the first customer tenant either with the transition implemented if the error has been corrected or without the transition implemented if the error has not been corrected.

20 Claims, 8 Drawing Sheets

| Feld | Key | Initi | Datenelement | DatenTyp | Länge | DezSt | Kurzbeschreibung |
|---|---|---|---|---|---|---|---|
| SEQUENCE | ☑ | ☑ | SAUS_TSP_SEQUENCE | CHAR | 3 | | 0Tenant specific processing - Sequence |
| PHASE POSITION | ☑ | ☑ | SAUS_TSP_PHASE_POSITION | INT2 | 5 | | 0Tenant specific processing - Number to order the phases |
| PHASE NAME | | | SAUS_TSP_PHASE_NAME | CHAR | 40 | | 0Tenant specific processing - Phase name |
| REPORT | | | PROGRAMM | CHAR | 40 | | 0ABAP-Programmname |
| VARIANT | | | RALDB_VARI | CHAR | 14 | | 0Variantenname |

FIG. 7

TENANT RESCUE FOR SOFTWARE CHANGE PROCESSES IN MULTI-TENANT ARCHITECTURES

CROSS-REFERENCE TO RELATED APPLICATION

This application is a continuation under 35 U.S.C. §120 of co-pending and co-owned U.S. patent application Ser. No. 12/847,470, filed on Jul. 30, 2010, now U.S. Pat. No. 8,522,070 issued on Aug. 27, 2013, which is incorporated herein by reference in its entirety.

TECHNICAL FIELD

The subject matter described herein relates to addressing tenant-specific errors and other issues that can arise in the use of a multi-tenant software architecture.

BACKGROUND

Various organizations make use of enterprise resource planning (ERP) software architectures to provide an integrated, computer-based system for management of internal and external resources, such as for example tangible assets, financial resources, materials, customer relationships, and human resources. In general, an ERP software architecture is designed to facilitate the flow of information between business functions inside the boundaries of the organization and manage the connections to outside service providers, stakeholders, and the like. Such architectures often include one or more centralized databases accessible by a core software platform that consolidates business operations, including but not limited to those provided by third party vendors, into a uniform and organization-wide system environment. The core software platform can reside on a centralized server or alternatively be distributed across modular hardware and software units that provide "services" and communicate on a local area network or over a network, such as for example the Internet, a wide area network, a local area network, or the like.

As part of the installation process of the core software platform on computing hardware owned or operated by the organization, one or more customized features, configurations, business processes, or the like may be added to the default, preprogrammed features such that the core software platform is configured for maximum compatibility with the organization's business processes, data, and the like.

The core software platform of an ERP software architecture can be provided as a standalone, customized software installation that runs on one or more processors that are under the control of the organization. This arrangement can be very effective for a large-scale organization that has very sophisticated in-house information technology (IT) staff and for whom a sizable capital investment in computing hardware and consulting services required to customize a commercially available ERP solution to work with organization-specific business processes and functions is feasible. Smaller organizations can also benefit from use of ERP functionality. However, such an organization may lack the necessary hardware resources, IT support, and/or consulting budget necessary to make use of a standalone ERP software architecture product and can in some cases be more effectively served by a software as a service (SaaS) arrangement in which the ERP system architecture is hosted on computing hardware such as servers and data repositories that are maintained remotely from the organization's location and accessed by authorized users at the organization via a thin client, such as for example a web browser, over a network.

SUMMARY

In one aspect, a computer-implemented method includes switching a multi-tenant system that comprises at least one processor, an application server implemented on the at least one processor, and a data repository to a downtime state to implement a transition from a current state to a target state of a core software platform. The application server provides access for each of a plurality of organizations to one of a plurality of customer tenants. Each of the plurality of customer tenants includes an organization-specific business configuration of the core software platform. The data repository stores core software platform content relating to the operation of the core software platform that is common to all of the plurality of customer tenants and tenant-specific content that relates to the organization-specific business configuration and that is available to only one of the plurality of customer tenants. During a second phase of the transition, an error associated with the tenant-specific content of a first customer tenant of the plurality of customer tenants is identified. The second phase includes modifying, in parallel and subsequent to completion of the first phase, the tenant-specific content of each of the plurality of customer tenants according to dependencies of the tenant-specific content on the core software platform content. The second phase is suspended for the first customer tenant while the second phase is continued for a remainder of the plurality of customer tenants for which an error has not been identified. After a scheduled duration of the downtime state, the multi-tenant system is reactivated such that the multi-tenant system includes the remainder of the plurality of customer tenants with the transition implemented and the first customer tenant either with the transition implemented if the error has been corrected or without the transition implemented if the error has not been corrected.

In some variations one or more of the following can optionally be included. A first phase of the transition that can include modifying the core software platform content prior to the second phase can be completed. The error associated with the tenant-specific content of the first customer tenant can be analyzed in an error analysis copy of the multi-tenant system. The transition can include a lifecycle management event that can include at least one of a business configuration deployment, an application-to-application (A2A) regeneration, or a Fast Search Infrastructure (FSI) load. If the error has not been corrected, a reprocessing of the first customer tenant can be commenced. The reprocessing can include performing troubleshooting to correct the error and continuing the second phase for the first customer tenant. A selection of a first subsequence of first sub-phases of the second phase for the first customer tenant and a second subsequence of second sub-phases of the second phase for a second customer tenant for which the second phase has also been suspended can be received from an administrator. The first subsequence can be executed on the first customer tenant in parallel with the second subsequence on the second customer tenant. At least one correction can be imported for application to the first customer tenant while the second phase for the first customer tenant has been suspended, the at least one correction addressing the error.

Articles are also described that comprise a tangibly embodied machine-readable medium operable to cause one or more machines (e.g., computers, etc.) to result in operations described herein. Similarly, computer systems are also described that may include a processor and a memory coupled to the processor. The memory may include one or more programs that cause the processor to perform one or more of the operations described herein.

The subject matter described herein provides many advantages. For example, a standardized procedure can be provided for applying updates and corrections to a multi-tenant software delivery system. Updates and corrections to the core software package can be performed using a common, standardized process pattern, and errors that arise in one or more customer tenants during transitioning of the multi-tenant system from a current state or version to a target state or version can be addressed individually without affecting the transitioning process for customer tenants that do not experience errors.

It should be noted that, while the descriptions of specific implementations of the current subject matter discuss delivery of enterprise resource planning software to multiple organizations via a multi-tenant system, the current subject matter is applicable to other types of software and data services access as well. Furthermore, all discussions of possible user interface interactions in the following description of various implementations of the current subject matter are intended to be merely illustrative and completely non-limiting. The scope of the subject matter claimed below therefore should not be limited except by the actual language of the claims.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7 is a screenshot showing more additional features according to an implementation of the current subject matter.

When practical, similar reference numbers denote similar structures, features, or elements.

DETAILED DESCRIPTION

In a software delivery configuration in which services provided to each of multiple organizations are hosted on a dedicated system that is accessible only to that organization, the software installation at the dedicated system can be customized and configured in a manner similar to the above-described example of a standalone, customized software installation running locally on the organization's hardware. However, to make more efficient use of computing resources of the SaaS provider and to provide important performance redundancies and better reliability, it can be advantageous to host multiple tenants on a single system that includes multiple servers and that maintains data for all of the multiple tenants in a secure manner while also providing customized solutions that are tailored to each tenant's business processes.

Figure 1:
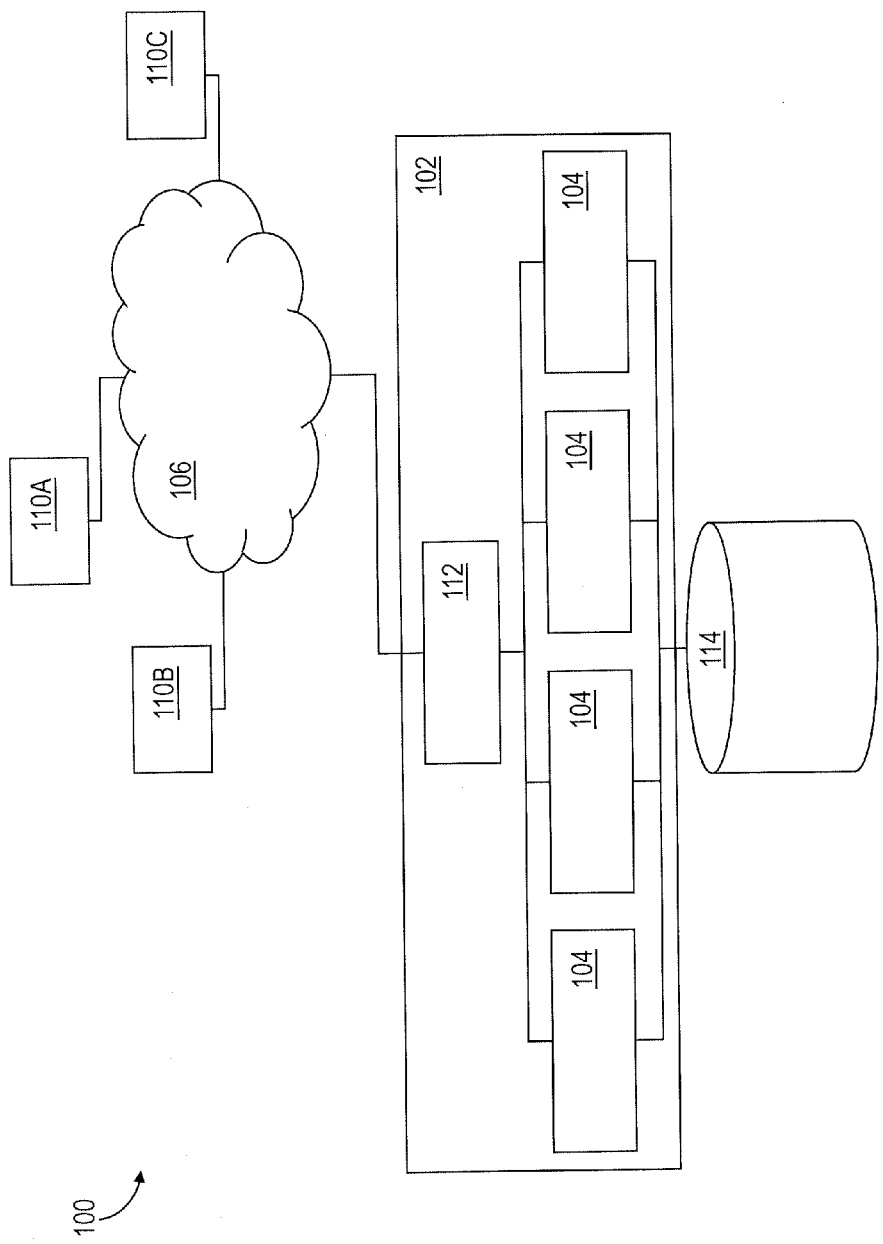
FIG. 1 is a diagram showing an example of a multi-tenant approach to providing customized software services to multiple organizations from a single architecture.

FIG. 1 shows a block diagram of a multi-tenant implementation of a software delivery architecture 100 that includes an application server 102, which can in some implementations include multiple server systems 104 that are accessible over a network 106 from client machines operated by users at each of multiple organizations 110A-110C (referred to herein as "tenants" of a multi-tenant system) supported by a single software delivery architecture 100. One example of such a software delivery architecture can include features similar to those of the Business ByDesign™ software available from SAP AG (Walldorf, Germany). For a system in which the application server 102 includes multiple server systems 104, the application server can include a load balancer 112 to distribute requests and actions from users at the one or more organizations 110A-110C to the one or more server systems 104. A user can access the software delivery architecture across the network using a thin client, such as for example a web browser or the like, or other portal software running on a client machine. The application server 102 can access data and data objects stored in one or more data repositories 114.

Figure 2:
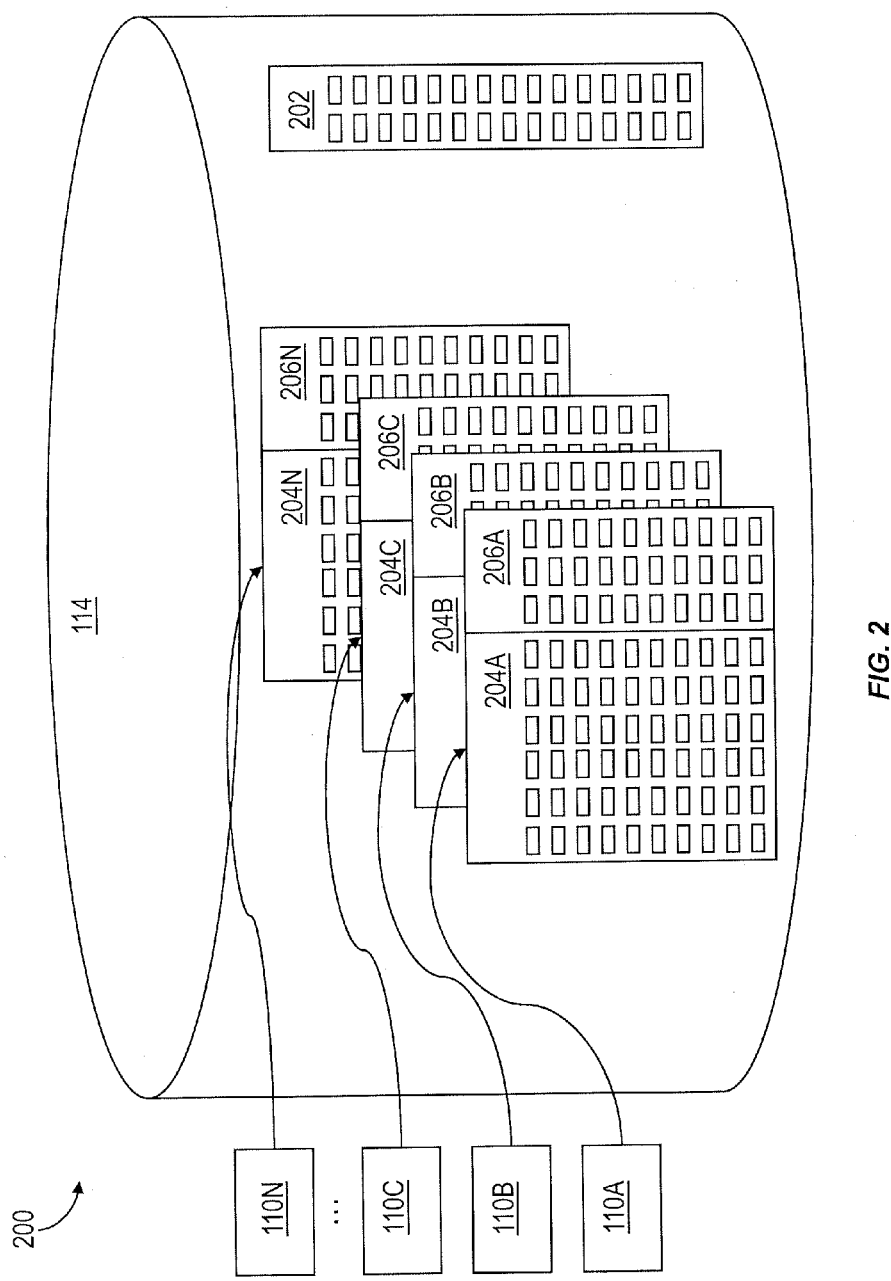
FIG. 2 is a diagram showing storage of both core software package data objects and tenant-specific data objects for each of multiple tenants of a multi-tenant system.

To provide for customization of the core software platform for each of multiple organizations supported by a single software delivery architecture 100, the data and data objects stored in the repository or repositories 114 that are accessed by the application server 102 can include three types of content as shown in FIG. 2: core software platform content 202, system content 204, and tenant content 206. Core software platform content 202 includes content that represents core functionality and is not modifiable by a tenant. System content 204 can in some examples be created by the runtime of the core software platform and can include core data objects that are modifiable with data provided by each tenant. For example, if the core software platform is an ERP system that includes inventory tracking functionality, the system content 204A-204N can include data objects for labeling and quantifying inventory. The data retained in these data objects are tenant-specific: for example, each tenant 110A-110N stores information about its own inventory. Tenant content 206A-206N includes data objects or extensions to other data objects that are customized for one specific tenant 110A-110N to reflect business processes and data that are specific to that specific tenant and are accessible only to authorized users at the corresponding tenant. Such data objects can include a key field (for example "client" in the case of inventory tracking) as well as one or more of master data, business configuration information, transaction data or the like. For example, tenant content 206 can include condition records in generated condition tables, access sequences, price calculation results, or any other tenant-specific values. A combination of the software platform content 202 and system content 204 and tenant content 206 of a specific tenant are presented to users from that tenant such that each tenant is provided access to a customized solution whose data are available only to users from that tenant.

A multi-tenant system such as that described herein can include one or more of support for multiple versions of the core software and backwards compatibility with older versions, stateless operation in which no user data or business data are retained at the thin client, and no need for tenant configuration on the central system. As noted above, in some implementations, support for multiple tenants can be provided using an application server 102 that includes multiple server systems 104 that handle processing loads distributed by a load balancer 112. Potential benefits from such an arrangement can include, but are not limited to, high and reliably continuous application server availability and minimization of unplanned downtime, phased updating of the multiple server systems 104 to permit continuous availability (one server system 104 can be taken offline while the other systems continue to provide services via the load balancer 112), scalability via addition or removal of a server system 104 that is accessed via the load balancer 112, and de-coupled lifecycle processes (such as for example system maintenance, software upgrades, etc.) that enable updating of the core software independently of tenant-specific customizations implemented by individual tenants.

Figure 3:
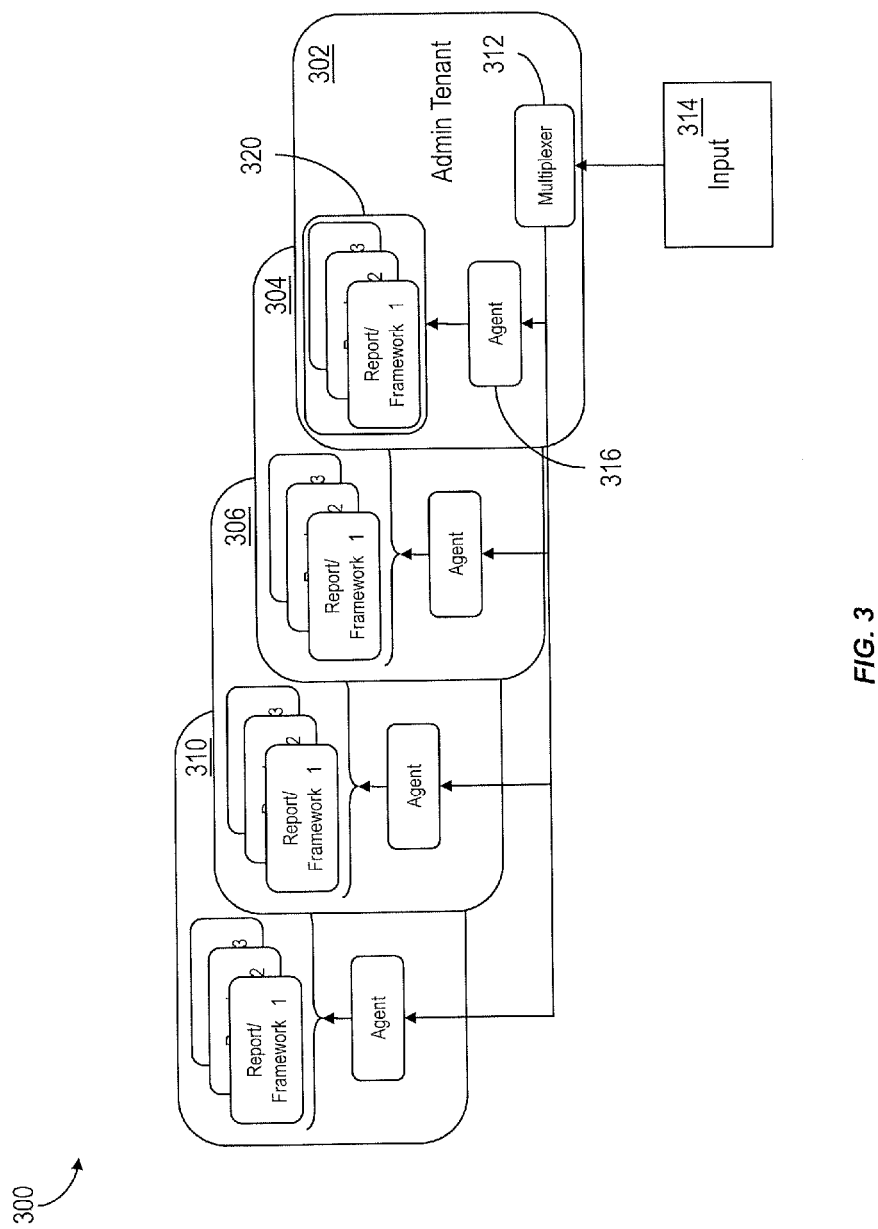
FIG. 3 is a diagram showing operation of a tenant multiplexer.

FIG. 3 shows a box diagram 300 of multiple tenants in a multi-tenant software architecture, such as that show in FIG. 1 and FIG. 2. An administrative tenant 302 is included in the software architecture along with the plurality of customer tenants 304, 306, and 310. It should be readily understood that while FIG. 3 shows 3 customer tenants, this should not be construed as limiting the actual number of tenants in a system consistent with an implementation of the current subject matter. A tenant multiplexer 312 at the administrative tenant 302 receives input 314, for example instructions for software upgrades, a report format to be run for each tenant in the multi-tenant software architecture, or the like. The input 314 can specify that the required operations are to be processed for all tenants (both administrative and customer), for the administrative tenant 302 and some subset of the customer tenants, or for only the administrative tenant. The multiplexer can then call an administrative tenant agent 316, which calls one or more of a set 320 of reports, modification frameworks, or other procedures or architectures for implementing the operations required by the input 314. If the input 314 specifies that all or some subset of the customer tenants are to be operated upon, the multiplexer 312 accesses the designated customer tenants via a trusted connection that does not require use of normal authentication procedures like user names and passwords. In one example, the multiplexer accesses the designated customer tenants via a remote function call (RFC). Via the trusted connection, the multiplexer 312 passes the set 320 of reports, modification frameworks, or other procedures or architectures for implementing the operations required by the input 314 to a tenant agent 322 at each customer tenant.

Such an approach can introduce several challenges. Making modifications to the core software platform, for example updating to a new version, implementing a change to the core functionality, or the like, can become a complicated and unpredictable process if each tenant's customized data objects and other tenant-specific configurations do not react in the same manner to the modifications. Additionally, during a lifecycle management (LM) event, such as for example an upgrade or update, many application specific actions, tasks, or the like, which are hereinafter referred to as LM actions, may have to be executed in a multi-tenant system. One or more of these LM actions have to run on every business tenant that exists in the multi-tenant system. Co-pending and co-owned application Ser. No. 12/847,919 (entitled "Multiplexer for Multi-Tenant Architectures"), the disclosure of which is incorporated herein by reference in its entirety, describes one possible approach by which lifecycle management tasks or events can be initiated in parallel on multiple tenants of multi-tenant system.

Applying updates, changes, hot fixes, or the like (hereinafter referred to as "updates") to any aspect of the provided software solution or to the infrastructures supporting delivery of the software solution can require that access to the software solution by end users be suspended for a period of time that is commonly referred to as downtime. Minimization of downtime is very desirable in nearly any software installation, especially if the software provides one or more business critical functions. When updates are required, they are often scheduled for times when the downtime will have the smallest possible impact on the organization, for example over a weekend, at night, or during some other period when as few as possible users associated with the organization are expected to be attempting to access software features or data. The downtime required for an update generally varies depending on the content of the update, and in a multi-tenant system can also depend strongly upon dependencies between core software platform content 202, system content 204, and tenant content 206. As an example, applying an update for a tenant whose installation includes numerous and complicated customizations and extensions that depend upon a large number of core software data objects and the like can require substantially longer downtime than a similar software change, update, or correction for a tenant whose installation lacks as much complexity and interdependency on standard data objects of the core software package.

Infrastructures that might need to be updated can include meta data repository frameworks, such as for example MDRS and xRepository. Both a meta data repository framework as well as the contents of such a framework can be fully integrated into design time. Changes can be delivered as part of a main interface software component, that can in some implementations be provided in the advanced business application programming (ABAP) language, as is for example Business ByDesign™ available from SAP AG (Walldorf, Germany). Such changes can be applied using one or more software deployment tools, such as service provisioning and account management (SPAM), which can in some examples be implemented in an ABAP environment.

Lifecycle management events can include one or more phases of actions to be performed in each of the customer tenants of the multi-tenant system and can result in transitioning the multi-tenant system and all of its customer tenants from a current state or version to a target state or version. Such lifecycle management events can include, but are not limited to, business configuration (BC) deployments, application-to-application (A2A) regeneration, or Fast Search Infrastructure (FSI) loads. A multiplexer 312, such as for example that shown in FIG. 3, can be used used to start and monitor the actions required to implement desired lifecycle management events synchronously for all tenants and to propagate the protocols into a single protocol. However, after such LM actions are initiated, a further issue can arise with monitoring progress of the LM actions across the multiple customer tenants. As each customer tenant can include customer-specific extensions that can include dependencies on core software features, data, data objects, and the like, the progression of LM actions may not proceed at the same rate or even with success across all customer tenants in the multi-tenant system.

With a large number of LM actions being performed in parallel across a large number of customer tenants, analyzing and/or finding solutions to errors, faults, interruptions, or the like to the process of executing the LM actions can be very labor intensive. Additionally, if multiple sequential LM actions are to be performed, an error causing an interruption or delay for even one customer tenant can cause the entire process to be interrupted for all customer tenants unless a procedure or framework is provided to allow isolation and analysis of customer tenants experiencing erroneous execution of an LM action independent of the progression of executing subsequent LM actions for customer tenants that have not experienced an error or interruption.

To complete the transition process from the current state or version of the core software platform to the target state, the transition is advantageously applied to each customer tenant. This transition process can include both tenant independent steps or actions and tenant dependent steps or actions. Tenant-independent steps or actions can include, but are not limited to, changes, modifications, upgrades, etc. to the core software platform and to business objects that are not tenant modifiable. Tenant-dependent steps or actions can include, but are not limited to business configuration features including data and data objects, and fast search infrastructure loads, which can be customized for the organization assigned to each customer tenant. Each customer tenant can have its own business configuration, data, which has to be loaded into the FSI.

As part of the transition process from the current state of the core software platform to the target or updated state of the core software platform, a shadow copy or "snapshot" of the multi-tenant system can be made. The shadow copy, which can include all functionality, data objects, data, and the like of the active version of the multi-tenant system as of the time that the shadow copy is prepared, can be upgraded in parallel to productive use of the active system. After the shadow system has been upgraded, it can be copied back to the active/productive system to complete the transition to the target version.

In the shadow system, the tenant independent features can be transitioned to the target version in a first phase. After the tenant independent processes are completed, processing of the tenant-dependent aspects can be initiated in parallel in a "tenant-dependent" second phase. A multiplexer 312 can call an update program for each customer tenant in batch mode to initiate transitioning of the tenant-dependent content for each customer tenant in parallel. If all of the customer tenants of the multi-tenant system are successfully transitioned to the target state, the active system is placed into a downtime, inactive state during which all of the content, such as for example, functionality, data objects, data tables, etc. from the shadow system are copied back into the active system.

However, it is not always the case that the parallel processing of all customer tenants in the multi-tenant system proceeds to completion uninterrupted by errors. According to implementations of the current subject matter, errors in the processing of one or more customer tenants during the tenant-dependent second phase can be handled by phasing out or deactivating the transition process in the customer tenant or tenants that have experienced errors. Error analysis can be performed in parallel to the continuing processing of the transition for the other customer tenants that are unaffected by the error.

A tenant rescue framework according to one or more implementations of the current subject matter can show the current multiplexer execution status for all customer tenants and thereby enable an administrator of the multi-tenant system to inactivate customer tenants experiencing errors. These inactivated customer tenants can then be bypassed by the multiplexer 312 so that processing the lifecycle management event can be continued for the other customer tenants of the multi-tenant system. Further errors occurring in later phases of the LM process can also require inactivation of additional customer tenants in the same way. Once the remaining customer tenants reach the end of the initial lifecycle management event successfully, or alternatively in parallel to the processing of the initial lifecycle management event for the remaining customer tenants, the problems of the inactive customer tenants can be addressed, for example by importing corrections. Such corrections may not cure the issues with one or more customer tenants which can therefore have to remain inactivated.

Reprocessing of inactivated customer tenants can be performed either after completion of the LM process or during the LM process. This can be necessary in some instances to ensure that all customer tenants are updated with a well defined systems state that is valid for all of customer tenants. The current subject matter provides an approach that can address this objective. A tenant rescue framework can permit an administrator to select subsequences of sub-phases of the second phase for each inactive tenant and to execute them in parallel. Inactive tenants that ultimately pass the last phase in the sequence can have their states changed from inactive to active.

Figure 4:
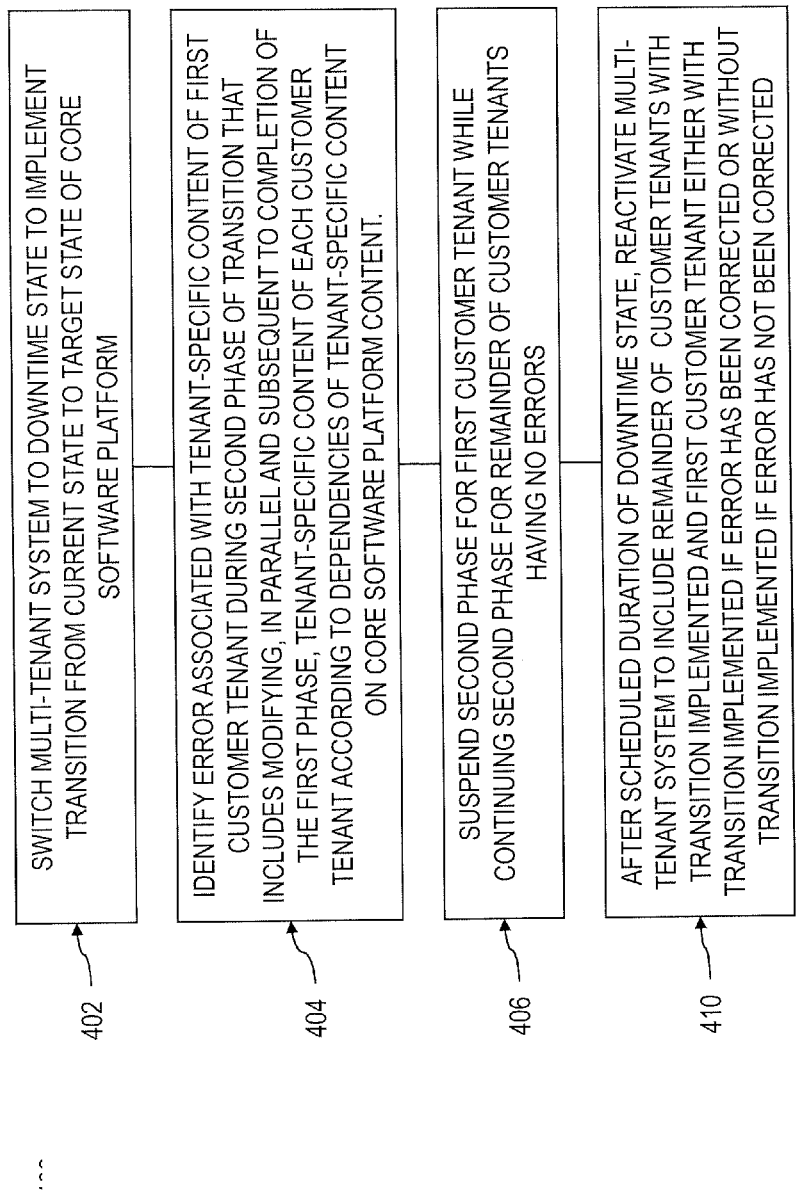
FIG. 4 is a process flow diagram illustrating a method.

FIG. 4 shows a process flow chart 400 illustrating a method consistent with implementations of the current subject matter. At 402, a multi-tenant system that includes an application server and a data repository can be switched to a downtime state to implement a transition from a current state to a target state of a core software platform. The application server can provide access for each of a plurality of organizations to one of a plurality of customer tenants. Each of the plurality of customer tenants can include an organization-specific business configuration of the core software platform. The data repository can store core software platform content relating to the operation of the core software platform that is common to all of the plurality of customer tenants and tenant-specific content that relates to the organization-specific business configuration and that is available to only one of the plurality of customer tenants. At 404, during a second phase of the transition, an error associated with the tenant-specific content of a first customer tenant of the plurality of customer tenants is identified. The second phase can include modifying, in parallel and subsequent to completion of a first phase of the transition, the tenant-specific content of each of the plurality of customer tenants according to dependencies of the tenant-specific content on the core software platform content. The first phase can include modifying the core software platform content prior to the second phase. At 406, the second phase can be suspended for the first customer tenant while continuing the second phase for a remainder of the plurality of customer tenants for which an error has not been identified. Optional features can include analyzing, in an error analysis copy of the multi-tenant system, the error associated with the tenant-specific content of the first customer tenant and attempting to remediate the error for the first customer tenant based on the analysis results. At 410, after a scheduled duration of the downtime state, the multi-tenant system can be reactivated such that the multi-tenant system includes the remainder of the plurality of customer tenants with the transition implemented and the first customer tenant either with the transition implemented if the error has been corrected or without the transition implemented error has not been corrected.

Figure 5:
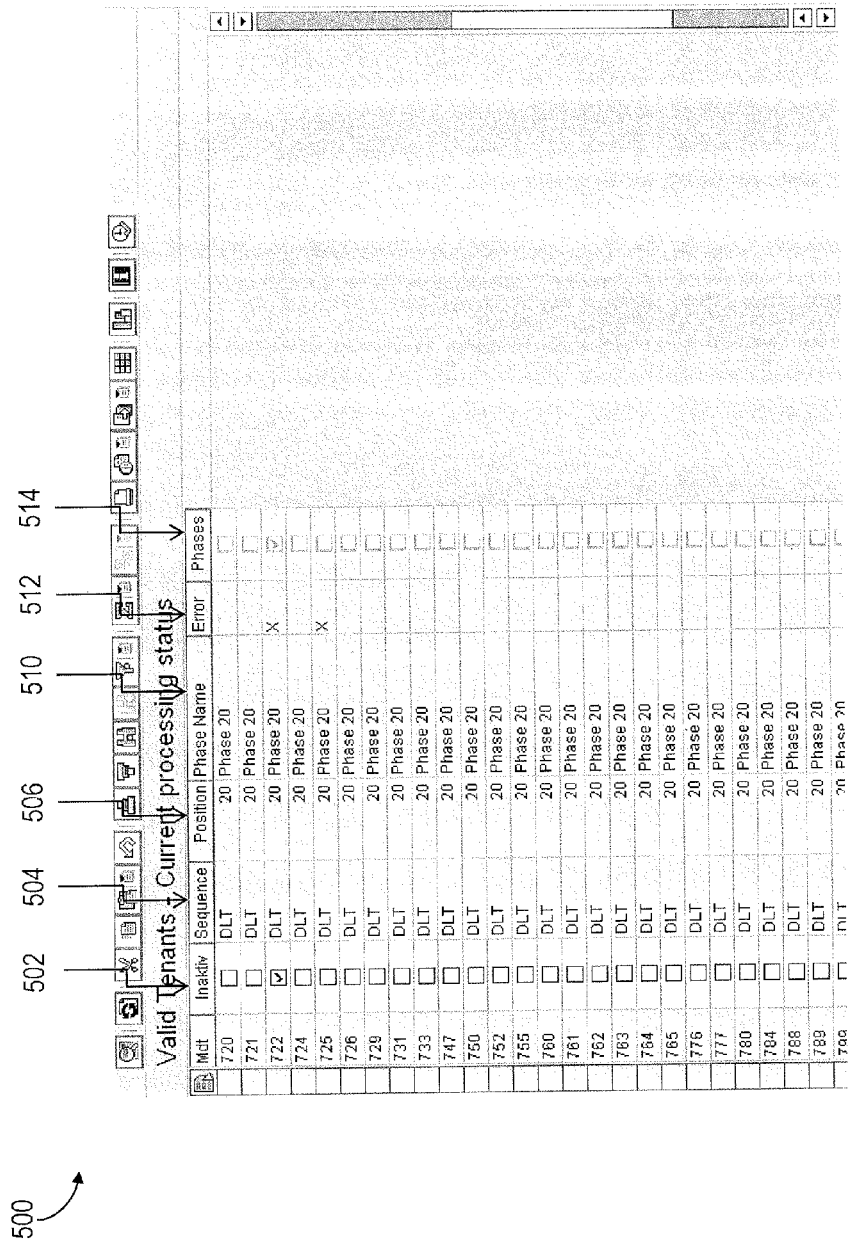
FIG. 5 is a screenshot showing features according to an implementation of the current subject matter.

FIG. 5 shows a screenshot of a table 500 in a user interface for managing tenant rescue operations according to an implementation of the current subject matter. The current execution status of all, or alternatively a subset of, customer tenants of the multi-tenant system can be displayed. The table 500 includes a tenant activity column 502 indicating whether each customer tenant is currently active or inactive. Via the user interface, a system administrator or other authorized user (hereinafter referred to as a "user") can change the status of each customer tenant, for example, the "sequence" 504, "position" 506, and "phase name" 510 columns in FIG. 5 can indicate the progress attained by each customer tenant during the tenant dependent part of the transition from the current state to the target state of the core software platform. If an error has caused the progression of the transition to stop for one or more of the customer tenants, an indication can be shown in the "error" column 512. Refreshing of the screen, for example using a clickable user interface element, keyboard command, or the like, can enable updating of the screen to reflect recent changes in the processing status due to activities of the multiplexer 312 as it progresses through the required actions associated with the LM event. The current setting, for example a configuration in which specific customer tenants are inactivated or activated can be saved or persisted using similar input functionality. Selections of phases, sequences, or other actions to be performed by the multiplexer 312 can be written into a corresponding database table.

To commence a rescue action for one or more tenants that have been inactivated, for example due to errors detected during the tenant-dependent phase of the core software platform transition, a user can mark the row in the table corresponding to the tenant to be rescued followed by selection a clickable user interface element, keyboard command, or the like to commence execution of the rescue operations as described herein.

Figure 6:
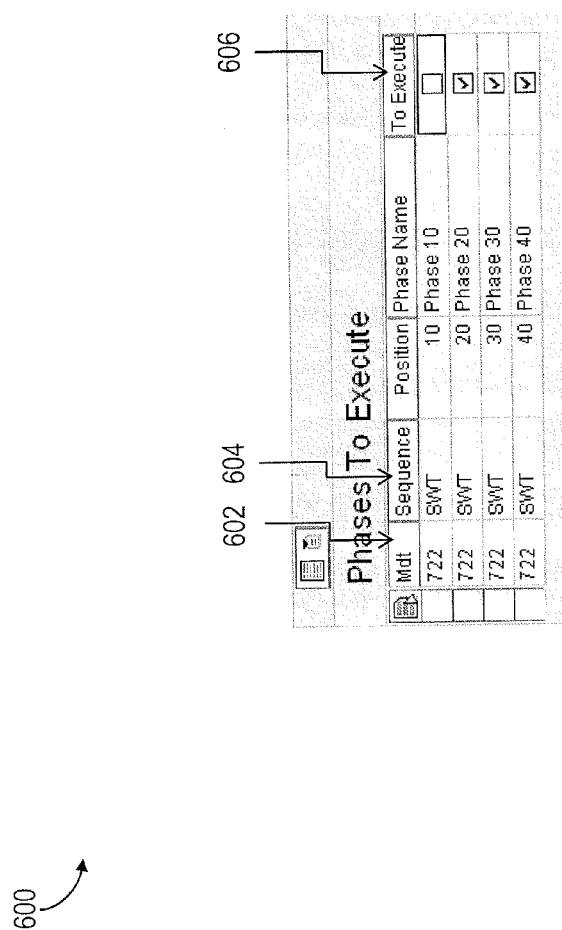
FIG. 6 is a screenshot showing additional features according to an implementation of the current subject matter.

Selection and activation of a line entry in the table 500 representing the status of an inactive tenant can in some variations open an additional window 600 for the particular tenant, such as for example that shown in the screenshot of FIG. 6. In this example, a drop down menu button 602 can be provided to allow a system administrator or other user to select the phase list. The table can then list all multiplexer phases of the chosen sequence, such as for example "SWT" in the sequence column 604 as shown in FIG. 6. In the rightmost column 606, the system administrator or other user can mark which of the available tenant rescues actions should be executed to rescue the corresponding customer tenant. Former selections can also be changed.

Phases of upgrade, modification, and correction that are executed using a tenant multiplexer 312 can also be persisted in a database table 700, such as for example that shown in the screenshot of FIG. 7. The database table 700 can optionally include key fields "Sequence" 702 and "Phase Position" 704 to assign a particular multiplexer phase to a sequence at a certain position. This position can be used to order the phases within a sequence. Additionally "Report" 706 and "Variant" 710 fields can specify which report and variant is to be executed for a given phase. In one example, two sequences (or multiplexer phase lists) can be saved in the table sequence="SWT" or "switch" can define the multiplexer phase list used by the upgrade, and sequence="DLT" or "delta" can contain the multiplexer phases passed during upgrade, correction, and a new put step of the transport system.

In various implementations, the tenant multiplexer 312 can administer a database table that persists the processing status of planned and executed jobs. This database table can used by the tenant rescue to extract the data shown in FIG. 7. To do so, the last report executed by the multiplexer for a certain tenant can be retained. The phase list can be used to assign the corresponding phase. This mapping may not be unique if a report and variant appears at several positions in the same sequence (therefore, this condition is advantageously not allowed to occur), and if the same report is part of several sequences (this condition can occur when also earlier execution results from a multiplexer state table are taken into consideration to determine sequence and phase). Generally, for all tenants only data from the database table persisting the processing status of planned and executed jobs is considered. These data represent in some variation executions not older than the starting time of the current lifecycle management event, if no tenant is inactive, and the starting time of the earliest lifecycle management event during which a tenant changed from active to inactive. Tenants not processed by the multiplexer 312 within this timeframe can optionally represented by empty lines or the like in the user interface displayed to the user.

As shown in FIG. 6, a user can select subsequences of phase lists that should be executed for a corresponding inactive tenant. For each phase of execution of the LM event by the tenant multiplexer 312 only one sequence can be chosen.

Phase subsequences can be entered as described above for some inactive tenants. Referring back to the table 500 of FIG. 5, the user can now mark (one or many) table lines representing inactive customer tenants. Upon receiving a run condition selection, for example via the UI, a save can be performed, the multiplexer phases selected to execute can be ordered by sequence and phase position, the multiplexer can be called with the corresponding report and variant for all (if any) customer tenants for which a phase represented by a combination of sequence and phase position should be executed to start the executions in parallel such that execution by the multiplexer 312 is set at "initial" as opposed to "restart," and the processing status can be analyzed. If the execution fails for a certain customer tenant, the phases remaining to execute for that customer tenant can be marked "obsolete" so that they will not be executed during the current run. The persistency of the phases the user wants to execute can be updated accordingly. The next pair of sequence and phase position can then be executed and post-processed as above for the remaining customer tenants. Customer tenants passing the last phase of the sequence successfully can be changed to active, and a save can be performed.

While a user changes tenant specific data in the UI, or if there are phases running or planned to run for a customer tenant, no other changes can be allowed until corresponding saves are performed. A log file can contain log information for processing of the various phases of a LM event by a tenant multiplexer 312. Additionally, state changes of customer tenants from active to inactive and vice versa can also be stored in the log file.

Figure 8:
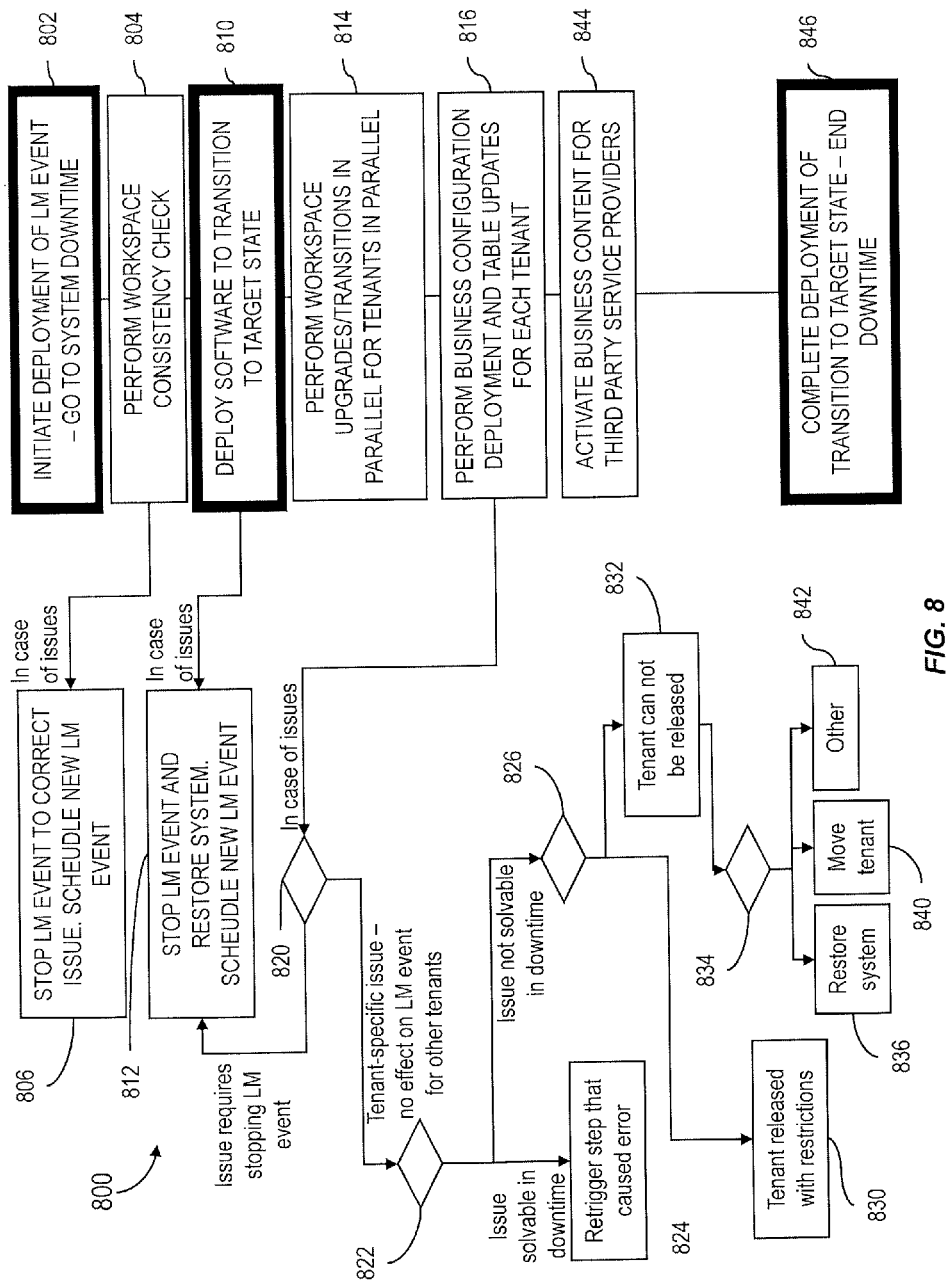
FIG. 8 is a process flow chart illustrating a method.

FIG. 8 is a process flow chart 800 illustrating aspects of a further implementation of the current subject matter for a parallel upgrade process for multiple tenants of a multi-tenant system with rescue of customer tenants for which issues or errors arise during deployment of a transition from a current state of the system to a target state. At 802, deployment of a lifecycle management event is initiated. This aspect is generally tenant-independent, as indicated by the black border. At 804, workspace consistency checks are performed for the specific tenants. If any issues are identified by this initial, pre-downtime check, at 806 the LM event can be stopped to correct the issue or issues. If the issues are cured, a new LM event can be scheduled if the current LM event cannot be completed in a timely manner after immediate resumption. At 810, software is deployed to transition the multi-tenant system to the target state. This generally can include the system entering a downtime period where productive use is not available for end users. This aspect, as noted by the black border, is also tenant independent and can include modifications, etc. to the core software package content. At 812, if issues are identified at this stage, the multi-tenant system can be restored to its current condition—the LM event is terminated and, if possible, rescheduled.

At 814, the transition process switches to a tenant-dependent phase at which workspace upgrades, transitions, etc. are performed in parallel for the customer tenants. These upgrades and transitions can include modifications to tenant-specific content such as data, etc. that are associated with system content, such as for example aspects of the core software platform functionality that are not tenant customizable but that can include tenant-specific data. At 816, business configuration deployment, table updates, and the like can be rolled out for each customer tenant. This content can include data, data objects, and the like that are customizable to comply with the business configuration and processes of the organization to which each customer tenant is tasked. Such content can include numerous dependencies on other content that are changed by the LM event. As such, one or more issues or errors can arise for one or more of the customer tenants. At 820, if such an issue is of sufficient severity to potentially impact completion of the LM event for other customer tenants than the customer tenant for which the issue is first identified, the LM event can be stopped and the system restored at 812. If necessary, a new LM event can be scheduled.

Alternatively, if the issue is determined at 820 to be tenant-specific and unlikely to cause issues for other customer tenants, at 822 a determination is made whether the issue can be solved during the scheduled downtime. If so, after resolution of the issue, the customer tenant can be reactivated for the transition process and the step or function for which the issue arose can be re-triggered at 824. If the issue can not be resolved during the scheduled downtime, a determination is made at 826 whether the customer tenant experiencing the issue can be released at 830 for end user productive use, perhaps with restrictions on functionality. If the customer tenant can not be released at 832, a determination can be made at 834 of how to proceed. Options can include restoring the entire system at 836, moving the customer tenant to an alternate system that has not undergone the LM event at 840, or other remediative actions at 842.

As customer tenants complete the transition process either without issues arising or with any arising issues remediated, such customer tenants can have business content for one or more third party service providers activated at 844. At 846, deployment of the transition of the multi-tenant system to the target state required by the LM event is completed and the multi-tenant system exits downtime to make all successfully transitioned customer tenants available for end user productive use.

The subject matter described herein can be embodied in systems, apparatus, methods, and/or articles depending on the desired configuration. In particular, various implementations of the subject matter described herein can be realized in digital electronic circuitry, integrated circuitry, specially designed application specific integrated circuits (ASICs), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transitory machine-readable medium storing instructions that, when executed by at least one processor, cause the at least one processor to perform operations comprising:

identifying an error during a second phase of a transition of a core software platform of a multi-tenant computing system from a current state to a target state, the multi-tenant computing system providing access to a plurality of customer tenants comprising an organization-specific business configuration of the core software platform, the organization-specific business configuration for each tenant of the plurality of tenants comprising core software platform content relating to the operation of the core software platform that is common to all of the plurality of customer tenants and tenant-specific content that relates to the organization-specific business configuration and that is available to only that customer tenant, the error being associated with first tenant-specific content of a first customer tenant of the plurality of customer tenants, the second phase comprising modifying, in parallel and subsequent to completion of a first phase, the tenant-specific content of each of the plurality of customer tenants according to dependencies of the tenant-specific content on the core software platform content;

causing a suspension of the second phase for the first customer tenant while continuing the second phase for at least one other tenant of the plurality of customer tenants for which an error has not been identified; and reactivating the multi-tenant system such that the multi-tenant system comprises the at least one other tenant of the plurality of customer tenants with the transition implemented and the first customer tenant either with the transition implemented if the error has been corrected or without the transition implemented if the error has not been corrected.

2. A computer program product as in claim 1, wherein the operations further comprise completing the first phase of the transition prior to the second phase, the first phase comprising modifying the core software platform content prior to the second phase.

3. A computer program product as in claim 1, wherein the operations further comprise analyzing, in an error analysis copy of the multi-tenant system, the error associated with the first tenant-specific content of the first customer tenant.

4. A computer program product as in claim 1, wherein the transition comprises a lifecycle management event comprising at least one of a business configuration deployment, an application-to-application (A2A) regeneration, or a Fast Search Infrastructure (FSI) load.

5. A computer program product as in claim 1, wherein the operations further comprise commencing, if the error has not been corrected, a reprocessing of the first customer tenant, the reprocessing comprising performing troubleshooting to correct the error and continuing the second phase for the first customer tenant.

6. A computer program product as in claim 1, wherein the operations further, comprise executing a first subsequence of first sub-phases of the second phase for the first customer tenant on the first customer tenant in parallel with a second subsequence of second sub-phases of the second phase for a second customer tenant for which the second phase has also been suspended.

7. A computer program product as in claim 1, wherein the operations further comprise, importing at least one correction for application to the first customer tenant while the second phase for the first customer tenant has been suspended, the at least one correction addressing the error.

8. A computer program product as in claim 1, wherein the multi-tenant system comprises or has access to at least one data repository storing the core software platform and the and tenant-specific content for each of the plurality of customer tenants.

9. A system comprising:
at least one programmable processor; and
at least one machine-readable medium storing instructions that, when executed by the at least one programmable processor, cause the at least one programmable processor to perform operations comprising:

identifying an error during a second phase of a transition of a core software platform of a multi-tenant computing system from a current state to a target state, the multi-tenant computing system providing access to a plurality of customer tenants comprising an organization-specific business configuration of the core software platform, the organization-specific business configuration for each tenant of the plurality of tenants comprising core software platform content relating to the operation of the core software platform that is common to all of the plurality of customer tenants and tenant-specific content that relates to the organization-specific business configuration and that is available to only that customer tenant, the error being associated with first tenant-specific content of a first customer tenant of the plurality of customer tenants, the second phase comprising modifying, in parallel and subsequent to completion of a first phase, the tenant-specific content of each of the plurality of customer tenants according to dependencies of the tenant-specific content on the core software platform content;

causing a suspension of the second phase for the first customer tenant while continuing the second phase for at least one other tenant of the plurality of customer tenants for which an error has not been identified; and reactivating the multi-tenant system such that the multi-tenant system comprises the at least one other tenant of the plurality of customer tenants with the transition implemented and the first customer tenant either with the transition implemented if the error has been corrected or without the transition implemented if the error has not been corrected.

10. A system as in claim 9, wherein the operations further comprise completing the first phase of the transition prior to the second phase, the first phase comprising modifying the core software platform content prior to the second phase.

11. A system as in claim 9, wherein the operations further comprise analyzing, in an error analysis copy of the multi-tenant system, the error associated with the first tenant-specific content of the first customer tenant.

12. A system as in claim 9, wherein the transition comprises a lifecycle management event comprising at least one of a business configuration deployment, an application-to-application (A2A) regeneration, or a Fast Search Infrastructure (FSI) load.

13. A system as in claim 9, wherein the operations further comprise commencing, if the error has not been corrected, a reprocessing of the first customer tenant, the reprocessing comprising performing troubleshooting to correct the error and continuing the second phase for the first customer tenant.

14. A system as in claim 9, wherein the operations further comprise executing a first subsequence of first sub-phases of the second phase for the first customer tenant on the first customer tenant in parallel with a second subsequence of second sub-phases of the second phase for a second customer tenant for which the second phase has also been suspended.

15. A system as in claim 9, wherein the operations further comprise, importing at least one correction for application to the first customer tenant while the second phase for the first customer tenant has been suspended, the at least one correction addressing the error.

16. A system as in claim 9, wherein the multi-tenant system comprises or has access to at least one data repository storing the core software platform and the and tenant-specific content for each of the plurality of customer tenants.

17. A computer-implemented method comprising:
identifying an error during a second phase of a transition of a core software platform of a multi-tenant computing system from a current state to a target state, the multi-tenant computing system providing access to a plurality of customer tenants comprising an organization-specific business configuration of the core software platform, the organization-specific business configuration for each tenant of the plurality of tenants comprising core software platform content relating to the operation of the core software platform that is common to all of the plurality of customer tenants and tenant-specific content that relates to the organization-specific business configuration and that is available to only that customer tenant, the error being associated with first tenant-specific content of a first customer tenant of the plurality of customer tenants, the second phase comprising modifying, in parallel and subsequent to completion of a first phase, the tenant-specific content of each of the plurality of customer tenants according to dependencies of the tenant-specific content on the core software platform content;
causing a suspension of the second phase for the first customer tenant while continuing the second phase for at least one other tenant of the plurality of customer tenants for which an error has not been identified; and
reactivating the multi-tenant system such that the multi-tenant system comprises the at least one other tenant of the plurality of customer tenants with the transition implemented and the first customer tenant either with the transition implemented if the error has been corrected or without the transition implemented if the error has not been corrected;
wherein the identifying, the causing, and the reactivating are performed by computed hardware.

18. A computer-implemented method as in claim 17, wherein the operations further comprise commencing, if the error has not been corrected, a reprocessing of the first customer tenant, the reprocessing comprising performing troubleshooting to correct the error and continuing the second phase for the first customer tenant.

19. A computer-implemented method as in claim 17, wherein the operations further comprise executing a first subsequence of first sub-phases of the second phase for the first customer tenant on the first customer tenant in parallel with a second subsequence of second sub-phases of the second phase for a second customer tenant for which the second phase has also been suspended.

20. A computer-implemented method as in claim 17, wherein the operations further comprise, importing at least one correction for application to the first customer tenant while the second phase for the first customer tenant has been suspended, the at least one correction addressing the error.

* * * * *